June 2, 1931. U. C. PEMBERTON ET AL 1,807,870
ARTIFICIAL FISH BAIT
Filed Nov. 4, 1929
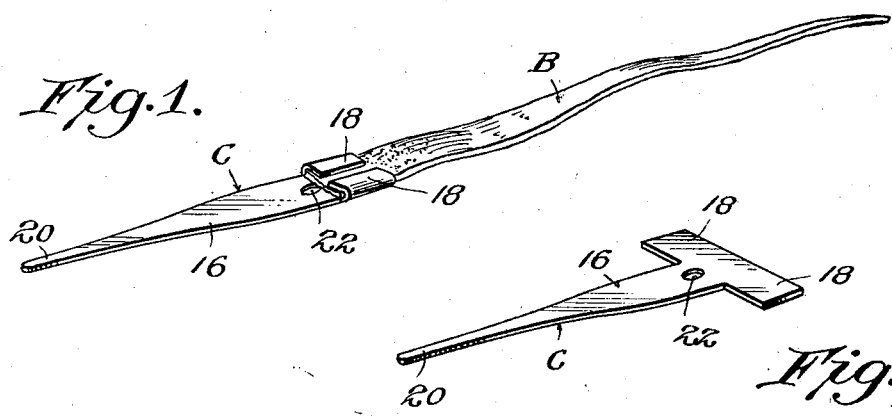
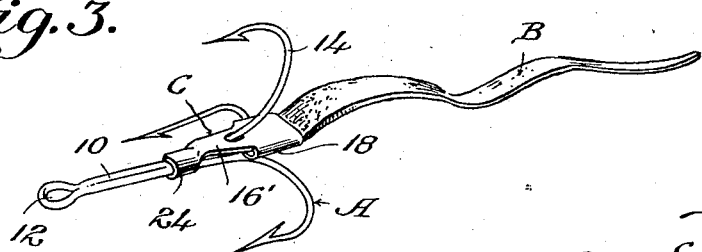
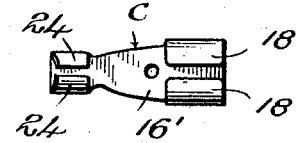
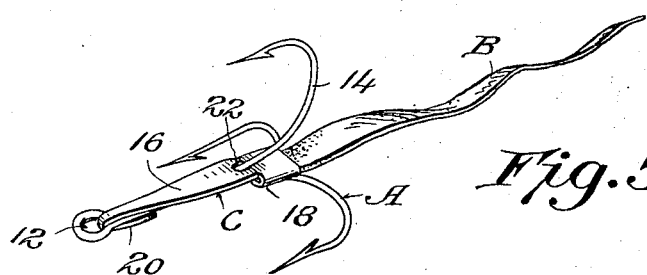
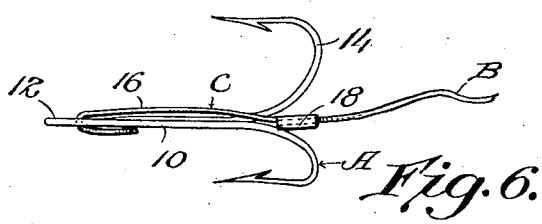
Inventor
Uz C. Pemberton
Joe B. Johnson
Attorney Patented June 2, 1931

1,807,870

UNITED STATES PATENT OFFICE

UZ C. PEMBERTON, OF SEFFNER, AND JOSEPH B. JOHNSON, OF TAMPA, FLORIDA

ARTIFICIAL FISH BAIT

Application filed November 4, 1929. Serial No. 404,789.

This invention relates to artificial fish baits, and has particular reference to artificial baits of the type which are adapted to be cast and which include one or more hooks and an attached lure.

Among bait casting fishermen it is universally recognized that under certain conditions fish will strike at one form of lure when they are entirely unattracted by other forms of lures, so that, among bait casting fishermen, it is the general practice to experiment to ascertain the best form of lure to be used at any given time.

Among the various available forms of artificial baits are some which must be entirely disconnected from the line when it is desired to change from one bait to another, and others in which the hook may remain attached to the line and different forms of lures interchangeably engaged with the hook.

The present invention relates to this latter type of bait and has for its object to provide improved means designed to facilitate the attachment of a lure to a hook and, with equal facility, to enable its detachment therefrom.

More particularly, it is an object of the invention to provide means for the purpose stated embodying an extremely simple, inexpensive structure capable of quick and easy manipulation to attach a lure to a hook, or to detach a lure from a hook, and which is effective, to insure against accidental detachment and loss of the lure from the hook.

With the foregoing and other objects in view, the invention consists in the novel features of construction, combination and arrangement of parts as will be hereinafter more fully described and illustrated in the accompanying drawings in which—

Figure 1 is a perspective view of a lure illustrating one form of the present improved device for effecting quick attachment of the lure to a hook.

Figure 2 is a perspective view of the lure attaching means shown in Fig. 1 before attachment of same to the lure.

Figure 3 is a perspective view illustrating an alternative embodiment of the present lure attaching device and showing same operatively connecting a lure with a hook.

Figure 4 is an elevation of the device illustrated in Fig. 3.

Figure 5 is a perspective view illustrating the device of Figs. 1 and 2 operatively connecting a lure with a hook; and Figure 6 is a side elevation of the assembly illustrated in Fig. 5.

Referring to the drawings in detail, A designates a hook, B a lure and C the present device for attaching the lure to the hook.

The hook A, which is inclusive, as usual, of a shank 10 and an eye 12, may have only one or a plurality of tines 14, while the lure B which, similarly, may be of any design, is illustrated herein merely for convenience as of the well known pork rind type so widely used by bait casting fishermen.

According to both embodiments of the present device C herein illustrated, said device is formed by a stamping operation or in other convenient and practical manner, from suitable sheet material, preferably rust proof metal such as brass, copper or the like.

According to the specific embodiment of the invention illustrated in Figs. 1, 2, 5 and 6, the stamped or otherwise formed blank device C (Fig. 2) is, in general, of T-shape, the same consisting of an elongated shank 16 having wings 18, 18 extending from opposite side edges thereof at or near one of its ends and, preferably, but not necessarily, being tapered towards its other end portion 20 whereby said end portion is rendered of sufficiently narrow width to provide a tongue freely insertable through the eye 12 of the hook. Through the shank 16, adjacent to its first mentioned end, is formed an opening 22 sufficiently large to enable the barbed end of the hook to be passed therethrough.

The device C as described is adapted for permanent attachment to the lure B and to effect such attachment one end of the lure is placed against one of the side faces of the device C and the wings 18, 18 then are bent over upon the lure to securely and permanently clamp same against the body portion of the device as illustrated in Fig. 1.

With the device C attached to the lure it is a very simple matter to attach the lure to the hook. The hook is simply engaged through the hole 22 in the device C and the latter moved along the tine 14 to the desired position, usually until the lure is substantially alined with the shank of the hook, whereupon the free end portion 20 of the shank 16 is threaded through the eye 12 of the hook and reversely bent to lie against the shank 10 of the hook as clearly illustrated in Figs. 5 and 6. Thus, the lure may be quickly and easily attached to the hook, and to detach same all that is necessary is to bend the free end portion 20 of the device C outwardly from the shank of the hook, push or pull said free end portion through the eye of the hook, and slide the device off of the tine 14.

According to the specific embodiment of the invention illustrated in Figs. 3 and 4, the device C is the same as the device illustrated in the other figures except that the shank 16 is shorter and, instead of having a free end adapted to be engaged through the eye of the hook, is provided at its free end with wings 24, 24, constructed similar to the wings 18, 18, and adapted to be bent around the shank 10 of the hook as illustrated in Fig. 3 to effect attachment of the lure to the hook, detachment of this form of the device C from the hook being readily effected simply by bending the wings 24 away from the shank 10 and, as in the first instance, sliding the device off of the tine 14.

We claim:

1. A device for attaching a lure to a fish hook comprising a member having an opening therein adapted to receive a shank portion of the hook, a formation on said member for attaching a lure thereto, and another formation on said member for detachably fastening the latter to the hook.

2. A device for attaching a lure to a fish hook comprising a member adapted to have a lure attached thereto, said member having an opening adapted to receive a shank portion of the hook, and a tongue formation on said member adapted to be inserted through the eye of the hook and bent to prevent disengagement of the member from the hook.

3. A device for attaching a lure to a fish hook comprising a sheet metal member including a shank having lateral wings extending therefrom at one end to be bent into clamping engagement with a lure, and formed at its other end into a tongue adapted to be inserted through the eye of a hook and bent to prevent disengagement of the member from the hook, said member having an opening therein to receive a shank portion of the hook.

In testimony whereof we affix our signatures.

UZ C. PEMBERTON.
JOE B. JOHNSON.